Oct. 20, 1953     H. X. ESCHENBRENNER     2,655,708
METHOD AND APPARATUS FOR MOLDING CEMENTITIOUS BODIES
Filed Sept. 23, 1952     2 Sheets-Sheet 1
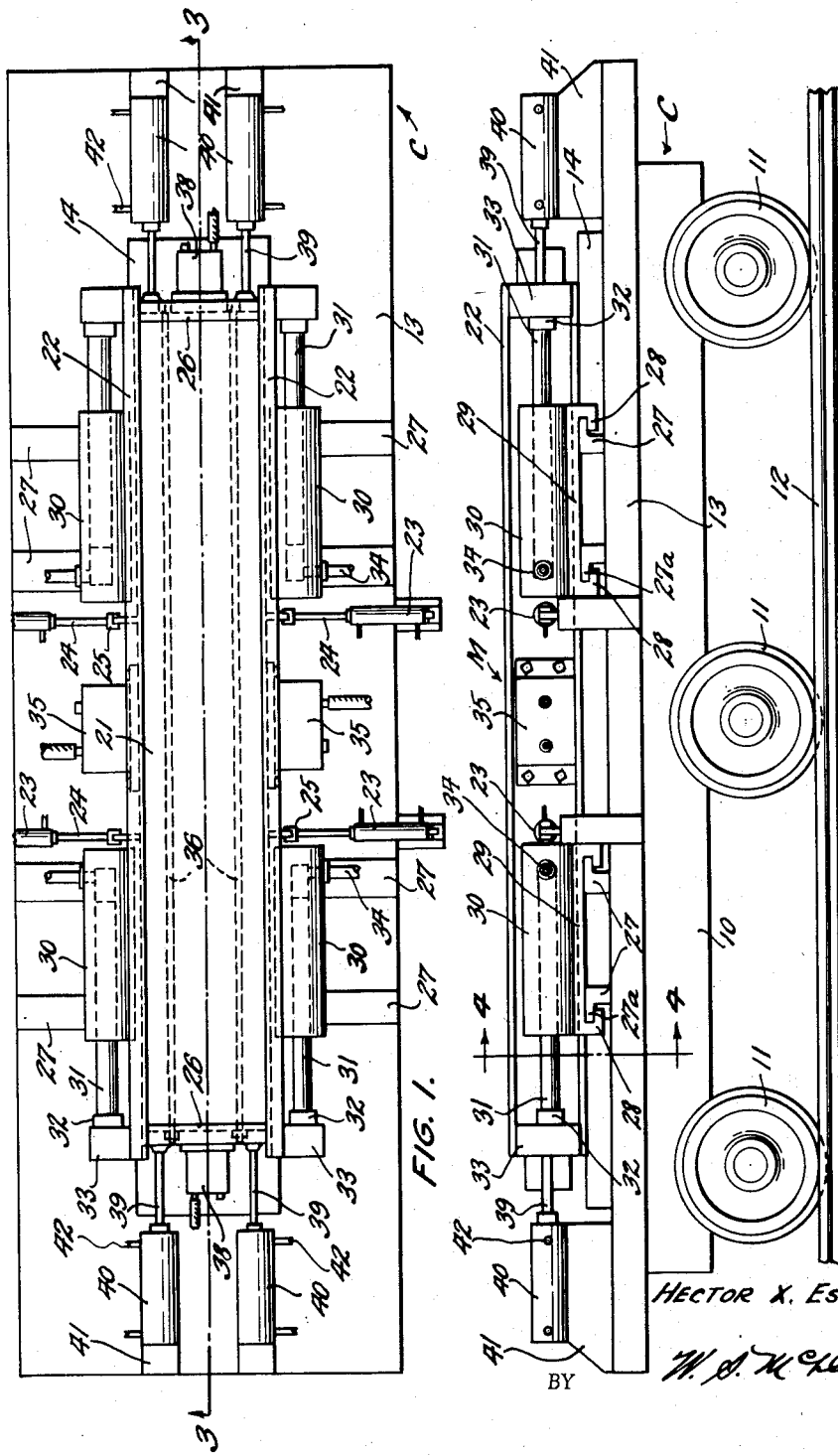
INVENTOR
HECTOR X. ESCHENBRENNER
BY
ATTORNEY Oct. 20, 1953 H. X. ESCHENBRENNER 2,655,708
METHOD AND APPARATUS FOR MOLDING CEMENTITIOUS BODIES
Filed Sept. 23, 1952 2 Sheets-Sheet 2
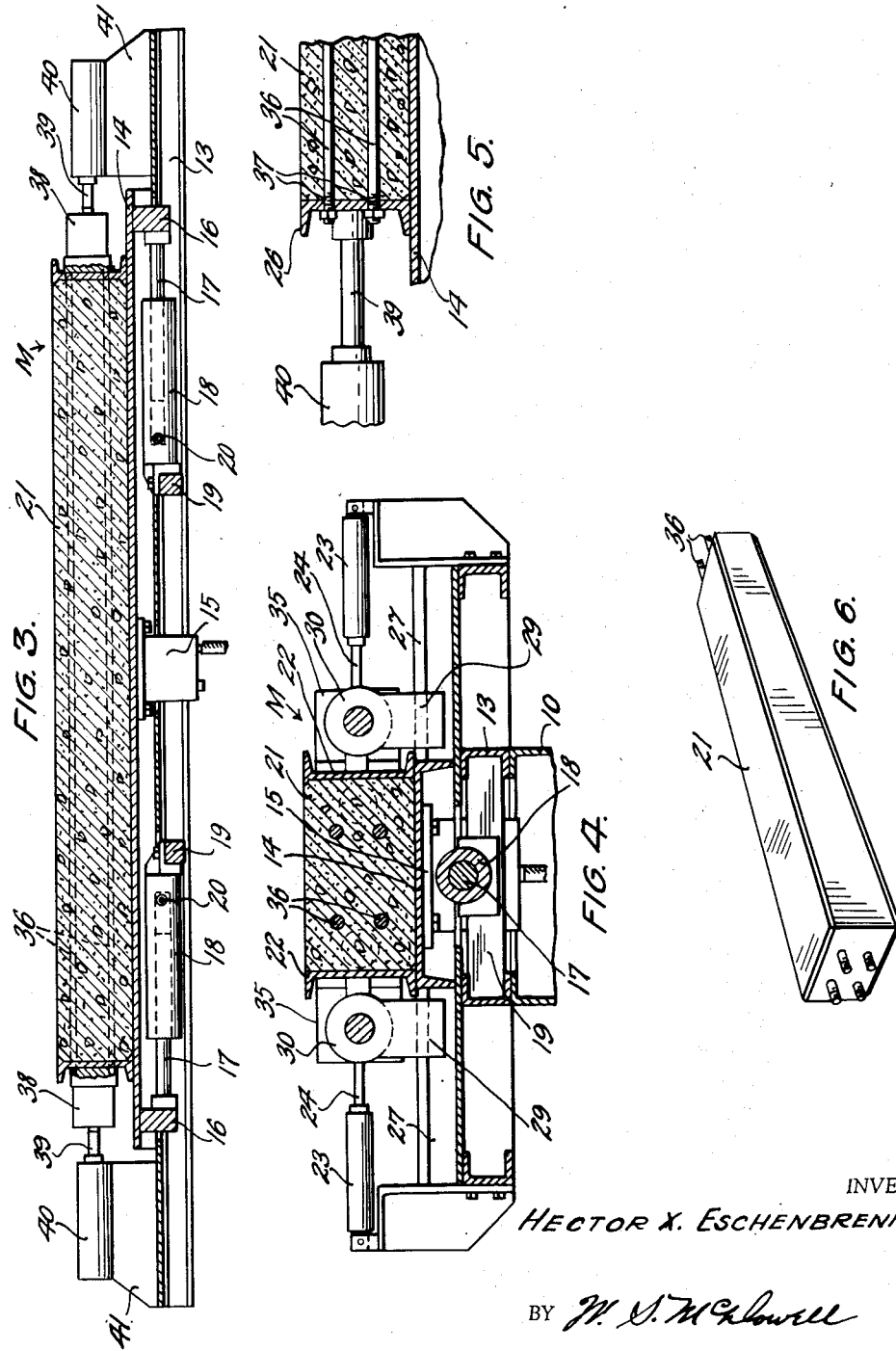
INVENTOR
HECTOR X. ESCHENBRENNER
BY
ATTORNEY Patented Oct. 20, 1953

2,655,708

UNITED STATES PATENT OFFICE 2,655,708

METHOD AND APPARATUS FOR MOLDING CEMENTITIOUS BODIES

Hector X. Eschenbrenner, Columbus, Ohio

Application September 23, 1952, Serial No. 310,996

6 Claims. (Cl. 25—41)

This invention relates to the molding or casting of cementitious bodies, and a main object thereof is to provide molding apparatus in which cementitious bodies, during molding or casting thereof, are subjected to high frequency vibration, whereby to improve the compaction of finely divided particles of a cementitious mix from which said bodies are formed and to produce bodies characterized by their uniform over-all high strength and freedom from structural weaknesses or molding defects.

Other principal objects of the invention are to provide molding apparatus for the casting of cementitious bodies in which said apparatus has the wall-forming mold members thereof placed under tensile stress at the time the mold members are subjected to high frequency vibration, as during the pouring of such molds with cementitious mixes, whereby to enable the vibratory forces to be imparted to the mix with greater effectiveness than heretofore, improving the operation in attaining desired compaction of the ingredients present in the body-forming mix; to provide a mold for casting cementitious bodies which comprises bottom, side, and end members, and wherein means are associated with said members for placing the entire mold under tension at the time the same contains, or is being poured with, a concrete mix; to provide a molding apparatus of this character in which cementitious bodies formed therein may be reinforced by internally disposed metallic rods, and wherein said rods may be maintained under tension during the pouring of the mold with a cementitious mix and while said mix is hardening in the mold; and to provide apparatus of this character which is simple in construction, easy and convenient to operate, and which improves generally the art of molding concrete bodies.

It is a further object of this invention to provide an improved and efficient method of forming cementitious bodies in molds which comprises placing one or more parts of an associated molding apparatus under tensile stress and thereafter applying vibrational forces to the tensioned mold part or parts, in order that such vibrational forces will be substantially fully transmitted to a cementitious mix contained within the molding apparatus without being absorbed or deadened to any material extent by the molding apparatus itself.

With these and other objects in view, which will appear as the description proceeds, the invention consists in the novel features of construction, combinations of elements, and arrangements of parts, all hereinafter more fully described and pointed out in the appended claims.

In the accompanying drawings, forming a part of this specification, and in which similar characters of reference denote like and corresponding parts throughout the several views thereof:

Fig. 1 is a top plan view of a vibratory, tensile-stressed molding apparatus for casting cementitious bodies, said apparatus being formed in accordance with the present invention;

Fig. 2 is a side elevational view of the apparatus;

Fig. 3 is a vertical longitudinal sectional view taken on the plane indicated by the line 3—3 of Fig. 1;

Fig. 4 is a vertical transverse sectional view on the plane disclosed by the line 4—4 of Fig. 1;

Fig. 5 is a detail longitudinal sectional view taken through one end of my improved molding apparatus and disclosing body-reinforcing rods positioned therein; and Fig. 6 is a perspective view of a block, slab, or beam of cementitious composition molded by the apparatus of the present invention.

Referring more particularly to the drawings, and to the molding apparatus of the present invention disclosed therein, a car, or other transport vehicle, has been indicated at C, the same including a frame 10 provided with axle-supported wheels 11, flanged for movement over track rails, indicated at 12. The frame 10 supports a substantially rectangular bed 13. On this bed there is placed a longitudinally extending channel-shaped base plate or pallet 14 of the molding apparatus M of the present invention.

Secured directly to the under surface of the base plate 14, in approximately the center thereof, is a rigid depending high frequency electrical or pneumatic vibrator 15, the latter being directly connected at the base plate 14 so that both parts vibrate in unison.

Also, the under side of the base plate, contiguous to its opposite longitudinal ends, carries rigid cross bars 16. These bars are joined with the outer ends of piston elements 17. The latter, in this instance, are slidably mounted in stationary cylinders 18, which are supported on transverse frame members 19 joined with the bed 13 of the car C. Fluid under pressure is adapted to enter one end of each of the cylinders 18, preferably through an inlet shown at 20, producing outwardly directed forces on the piston elements 17. These forces are applied directly to the cross bars 16 in a manner placing the entire base plate of the apparatus under tension.

My improved apparatus is formed to produce concrete blocks, roof or floor slabs, beams, poles, piles, or other elongated or flat bodies, such as that indicated at 21 in the drawings. The apparatus, in addition to the base plate 14, includes longitudinally extending side wall beams 22. These beams also may possess a channel-shaped configuration, having relatively narrow horizontal flanges arranged to project outwardly. The lower of these flanges slidably rests on the upper surface of the base plate 14. The spacing of the beams relative to each other in controlling the width of the cast body 21 may be governed by means of fluid-actuated cylinders shown at 23.

Each of these last-named cylinders is provided with a slidable fluid-actuated piston 24 which has its outer end pivotally connected, as at 25, with a beam 22. By admitting fluid under pressure into the cylinders 23, the pistons therein may be actuated to move the beams 22 until they contact the ends of transversely extending end members 26 of the mold. The beams 22 are guided in their sliding movement by means of the transversely extending parallel guide rails 27 which are mounted on the top of the car bed 13. The guide rails are formed with laterally offset flanges 27a, the latter being engaged by flanges 28 formed on the ends of cylinder-carrying brackets 29 connected with the sides of the beams 22.

The brackets 29 further include cylinders 30. Slidably mounted in the cylinders 30 are longitudinally extending piston rods 31, the latter being disposed in parallel relationship with the beams 22 and on the opposite sides thereof and at the ends of each of said beams. The outer ends of the rods 31 are fastened in a rigid manner, as at 32, to laterally disposed thrust-receiving extensions 33 formed at the opposite ends and sides of each of the beams 22. An actuating fluid may be admitted through the hose or pipe line connections 34 to the cylinders 30, whereby to apply outwardly directed pressures to the piston rods 31. These pressures are exerted on the ends of the beams 22 in opposite directions, so that said beams, along with the base plate, may be placed simultaneously under tension while subjected to high frequency vibration. In this connection, each of the beams is provided with an electrically or pneumatically actuated vibrator unit 35 arranged between the cylinders 30.

The end members 26 of the molds are united by longitudinally extending tie or reinforcing rods 36, the latter having threaded ends 37 which pass through openings or slots formed in the end walls 26 of the molding apparatus. Each of the end walls carries a vibrator unit 38, which is similar in construction and operation to the vibrator units disclosed at 15 and 35. The rods 36 are placed under tension by providing each of the end members 26 with pistons 39 which are movably positioned in fluid-receiving cylinders 40, the latter being stationarily supported on blocks 41 arising from the car bed 13. By introducing fluid under pressure into the inlet-outlet connections 42 of the cylinders 40, the reinforcing rods 36 are tensioned at the time the same are subjected to high frequency vibration, as may be produced by the operation of the vibrating unit 38 carried on the end walls 26 of the mold.

In the use of the apparatus set forth, the members of the mold with which the cementitious mix contacts are placed under tension, and concomitantly are subjected to rapid vibratory forces. The effectiveness of such forces is greatly enhanced by the state of tension set up in the mold-forming members. The construction and operation result in much more effective compaction of the particles composing the concrete mix, and consequent increased strength in the finished article, than has heretofore been obtainable in the vibrating of non-tensioned mold members. While I have shown the mold as being mounted on a portable base, it is apparent that this construction is a matter of preference and the mold may, if desired, be mounted on a stationary or other foundation. However, by being mounted on a car, or other similar wheeled vehicle, the mold may be filled with a mix at one location and, before or after being vibrated, moved to another location for discharge of the cementitious bodies molded therein.

In accordance with the method aspects of the present invention, one or more of the component parts of a molding apparatus containing a relatively dry cementitious mix is placed under tensile stress without exceeding the elastic limits of such part or parts. The tensioned part or parts are then subjected to vibrational forces of desired magnitude and frequency and serve to transmit such forces directly to the cementitious mix contained within the molding apparatus to cause the mix to be compacted and densified within the mold cavity and excess water and other fluids within the mix to rise to the upper surface thereof. By tensioning the mold or mold parts prior to vibrating, such parts do not absorb or deaden the vibrational forces applied thereto, but serve to efficiently transmit such forces directly to the mix within the mold. By way of illustration, the step of tensioning the mold parts in the present method and the results of such tensioning are analogous to tensioning the string of a musical instrument, such as a violin, whereby, upon the application of vibrating forces to the tensioned member, the latter acts to continue and prolong such vibration as opposed to the action of an untensioned member which serves only to absorb and deaden the vibrational forces applied thereto. It has been found that by tensioning the mold parts prior to vibrating the mix, the time ordinarily required to obtain the proper density and compaction of a mix, particularly a relatively dry mix, is greatly reduced in comparison with the use of untensioned mold parts as done heretofore. Also, the end product produced through practice of the present invention is characterized by materially increased strength characteristics attributed to increased density and uniformity of the mix.

Various other arrangements and modifications of the structure will be apparent to those skilled in the art and, therefore, are to be included in the purview of the present invention.

I claim:

1. The method of molding cementitious articles which comprises introducing a cementitious plastic mix within the cavity of a mold; placing at least one of the walls of the mold defining the mix-receiving cavity under tensile stress; and applying vibrational forces to the tensioned wall to compact said mix.

2. The method of forming cementitious articles in a mold having at least one side wall defining a mold cavity which comprises introducing a plastic cementitious mix within the cavity of the mold; applying tensioning forces to at least one side wall of the mold; and vibrating the tensioned side wall of the mold to cause said mix to be compacted within the cavity of said mold.

3. In apparatus for molding cementitious bodies; a mold body defining therein a cavity for the reception of a cementitious mix; means connected with at least a part of said mold body defining said cavity for placing such part under tension forces; and means engageable with the tensionable part of said mold body for imparting vibration thereto, said part when placed under tension serving to transmit vibrations imparted thereto to a cementitious mix positioned in the cavity of said mold body without absorbing a material proportion of the vibrational forces imparted thereto.

4. In apparatus for molding cementitious bodies; a mold body comprising a plurality of relatively movable, metallic mold sections defining a cavity for the reception of a plastic cementitious mix; tensioning means connected with at least one of said mold sections and operable to place the latter under tension stress; and a vibrator attached to said one of said mold sections for imparting vibrational forces to said section and therethrough to a cementitious mix received in said cavity.

5. In apparatus for molding cementitious bodies; a mold comprising a bottom wall and relatively movable side and end walls, the walls of said mold defining therein a mold cavity into which a plastic cementitious mix may be introduced for molding; vibrator means connected with at least one of the walls of said mold and operable to impart vibrational forces thereto; and means connected with said one of the walls of said mold for placing the same under tension during operation of said vibrator means.

6. In apparatus for molding cementitious bodies; a mold comprising a bottom wall and relatively movable side and end walls, the walls of said mold defining therein a mold cavity for the reception of a plastic mix and metallic rods arranged to be imbedded in said mix to reinforce the same; means for connecting a plurality of metallic reinforcing rods between the end walls of said mold; means connected with the end walls of said mold for moving the same relatively apart and thereby to tension the reinforcing rods connected therebetween; means connected with the side walls of said mold for placing the latter under tensile stress; and vibrator means connected with the side walls of said mold for vibrating the latter when placed under tensile stress.

HECTOR X. ESCHENBRENNER.

No references cited.